(12) United States Patent
Lubowe et al.

(10) Patent No.: US 12,314,795 B2
(45) Date of Patent: May 27, 2025

(54) CONDUCTIVE INK-BASED PARASITIC ELEMENT FOR A DEVICE ANTENNA

(71) Applicant: Google LLC, Mountain View, CA (US)

(72) Inventors: Henry Michael Lubowe, New York, NY (US); Lukas Bielskis, Berkeley, CA (US); Thomas Consolazio, San Francisco, CA (US); Ritu Verma, San Diego, CA (US); Kevin Li, San Diego, CA (US); Hunk Gu, Shanghai (CN); Dennis McCray, San Diego, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/251,772

(22) PCT Filed: May 19, 2022

(86) PCT No.: PCT/CN2022/093823
§ 371 (c)(1),
(2) Date: May 4, 2023

(87) PCT Pub. No.: WO2023/221035
PCT Pub. Date: Nov. 23, 2023

(65) Prior Publication Data
US 2024/0354546 A1 Oct. 24, 2024

(51) Int. Cl.
*G06K 19/077* (2006.01)
*H01Q 1/44* (2006.01)

(52) U.S. Cl.
CPC ......... *G06K 19/07762* (2013.01); *H01Q 1/44* (2013.01)

(58) Field of Classification Search
CPC .... G06K 19/07762; H01Q 1/44; H01Q 13/10; H01Q 19/104; H01Q 1/273
See application file for complete search history.

(56) References Cited

U.S. PATENT DOCUMENTS 8,259,024 B2 * 9/2012 Abe .................. H01Q 7/08
343/788
9,658,604 B2 * 5/2017 Nagahama ............. G04R 60/10
(Continued)

FOREIGN PATENT DOCUMENTS

| CN | 205177994 U | 4/2016 |
|---|---|---|
| CN | 106532226 A | 3/2017 |

(Continued)

OTHER PUBLICATIONS

International Search Report for PCT/CN2022/093823, mailed on Nov. 25, 2022, 4 pages.
(Continued)

*Primary Examiner* — Seung H Lee
(74) *Attorney, Agent, or Firm* — DORITY & MANNING P.A.

(57) ABSTRACT

A wearable device is provided. The wearable device includes a printed circuit board, a conductive housing, an antenna defined by a gap between the printed circuit board and the conductive housing, a cover having an outer surface, and a label. The label includes a film and a parasitic element. The parasitic element is located between the film and the outer surface of the cover and can be joined to the cover during an injection molding process. Further, the parasitic element can be disposed between numerous layers that are printed or otherwise applied to the to the label.

22 Claims, 14 Drawing Sheets

(56) References Cited

U.S. PATENT DOCUMENTS

| | | | |
|---|---|---|---|
| 10,992,029 B2 | 4/2021 | Wei et al. | |
| 11,150,612 B2 * | 10/2021 | Naka | G04G 21/04 |
| 2010/0060459 A1 | 3/2010 | Stole et al. | |
| 2013/0241779 A1 | 9/2013 | Korva | |
| 2017/0229764 A1 | 8/2017 | Aoki et al. | |
| 2018/0028072 A1 * | 2/2018 | Shi | A61B 5/6833 |
| 2019/0020380 A1 * | 1/2019 | Chiu | G06F 1/163 |
| 2019/0109367 A1 | 4/2019 | Tseng et al. | |
| 2020/0334425 A1 | 10/2020 | Gangopadhyay et al. | |

FOREIGN PATENT DOCUMENTS

| | | |
|---|---|---|
| CN | 108886197 | 11/2018 |
| CN | 114399012 | 4/2022 |
| WO | WO 0016189 | 3/2000 |

OTHER PUBLICATIONS

Extended European Search Report for Application No. EP 22888610.7, mailed Apr. 25, 2024, 8 pages.

International Preliminary Report on Patentability for Application No. PCT/CN2022/093823, mailed Nov. 28, 2024, 6 pages.

* cited by examiner

CONDUCTIVE INK-BASED PARASITIC ELEMENT FOR A DEVICE ANTENNA

PRIORITY CLAIM

The present application is based upon and claims the right of priority under 35 U.S.C. § 371 to International Application No. PCT/CN2022/093823 filed on May 19, 2022, which is incorporated by reference herein.

FIELD

The present disclosure relates generally to wearable devices. More particularly, the present disclosure relates to a wearable device that includes a parasitic element to improve performance (e.g., radiation efficiency) of the wearable device's antenna.

BACKGROUND

Modern electronic devices frequently include one or more radio-frequency (RF) antennas to facilitate wireless communication with other electronic devices. The antennas can be included in an electronic device, such as a wearable device, so that the device can be equipped with LTE, global positioning system (GPS), Wi-Fi and Bluetooth capabilities. Oftentimes, particularly in the case of wearable devices, the antenna signal can have a tendency to radiate from the device towards a user's skin rather than out into the environment, which can negatively impact the performance of the device depending on the use of the device.

Thus, a need exists for a wearable device that incorporates a means of directing the radiation from the device towards the environment rather than the user's skin.

SUMMARY

Aspects and advantages of embodiments of the present disclosure will be set forth in part in the following description, or can be learned from the description, or can be learned through practice of the embodiments.

In one aspect, a wearable device is provided. The wearable device includes a printed circuit board, a conductive housing, an antenna, a cover having an outer surface, and a label comprising a film and a parasitic element. Further, the parasitic element is located between the film and the outer surface of the cover.

In some implementations, the parasitic element can include a conductive ink layer.

In some implementations, the label can be insert molded onto the outer surface of the cover.

In some implementations, the label can include a decorative ink layer between the film and the parasitic element.

In some implementations, the label can include a non-conductive masking ink layer between the decorative ink layer and the parasitic element.

In some implementations, the label can include a first insulating ink layer.

In some implementations, the label can include a first gloss layer between the non-conductive masking ink layer and the first insulating ink layer.

In some implementations, the label can include a second insulating ink layer, where the parasitic element can be between the first insulating ink layer and the second insulating ink layer.

In some implementations, the label can include a bonding layer, where the bonding layer can connect the label to the outer surface of the cover.

In some implementations, the label can include a second gloss layer between the second insulating ink layer and the bonding layer.

In some implementations, the antenna can be a slot antenna defined by a gap between the printed circuit board and the conductive housing.

In some implementations, the parasitic element is electrically grounded to the printed circuit board via radio-frequency grounding, direct current grounding, or a matching circuit.

In another aspect, a label for a wearable device containing an antenna is provided. The label includes multiple layers including a film, a decorative ink layer, a non-conductive masking ink layer, a first insulating ink layer, a parasitic element, and a second insulating ink layer. Further, the multiple layers of the label are applied onto the film, and the parasitic element includes a conductive ink layer.

In some implementations, the label can include a bonding layer.

In some implementations, the label can include a first gloss layer.

In some implementations, a portion of the conductive ink layer can be exposed and free of additional layers printed thereon.

In some implementations, the label can be configured for being joined to a plastic cover during an insert molding process.

In still another aspect, a method of forming a label for a wearable device containing an antenna is provided. The method includes printing one or more layers of non-conductive masking ink onto a film, printing one or more layers of conductive ink onto the film to define a parasitic element, printing a bonding layer onto the film to form the label, and forming the label into a shape that matches a shape of a cover to which it is to be applied.

In some implementations, the label can be joined to an outer surface of the cover during an insert molding process, and the bonding layer can join the label to the cover.

In some implementations, the method can include printing one or more layers of decorative ink onto the film.

In some implementations, the method can include printing one or more layers of insulating ink onto the film.

In some implementations, the method can include trimming the label to remove any excess.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
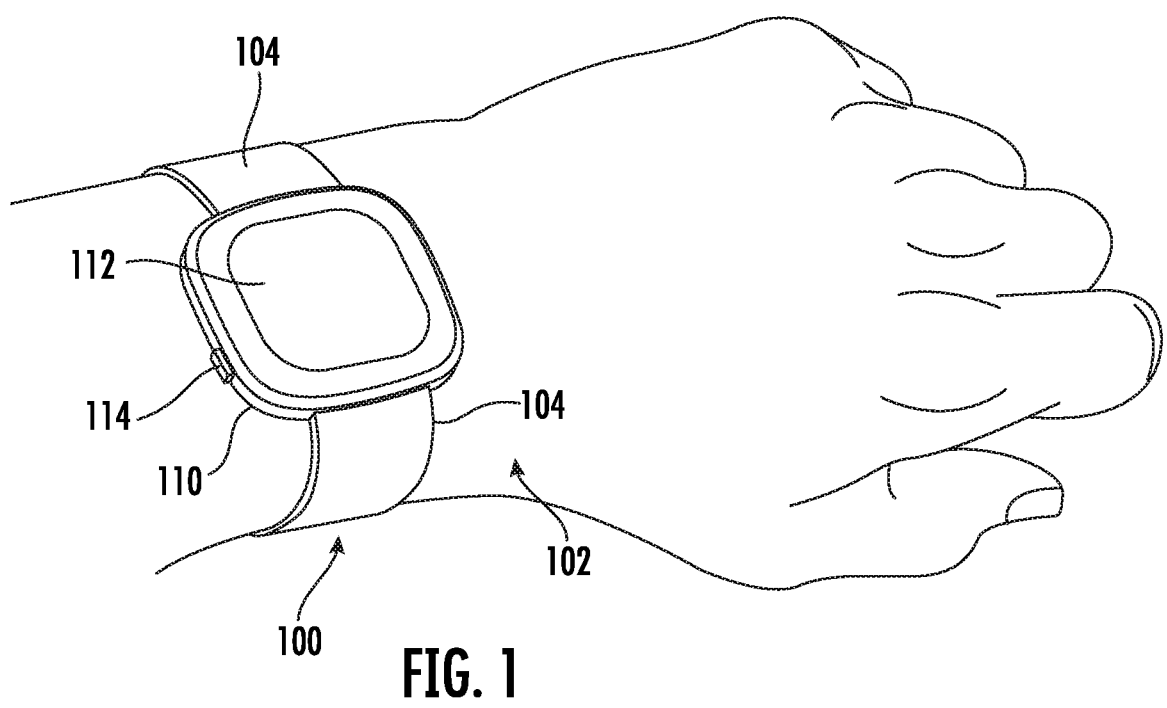
FIG. 1 depicts a wearable device according to some implementations of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "about," "approximately," or "generally," when used to modify a value, indicates that the value can be raised or lowered by 5% and remain within the disclosed embodiment. Further, when a plurality of ranges are provided, any combination of a minimum value and a maximum value described in the plurality of ranges are contemplated by the present invention. For example, if ranges of "from about 20% to about 80%" and "from about 30% to about 70%" are described, a range of "from about 20% to about 70%" or a range of "from about 30% to about 80%" are also contemplated by the present invention.

Example aspects of the present disclosure are directed to a wearable device that can be worn, for instance, on a user's wrist or other location on the user's body. The wearable device can include an antenna, a conductive housing (e.g., a metal housing), a circuit board (e.g., a printed circuit board) located within the conductive housing, a cover (e.g., a plastic cover), and a label including film and a parasitic element. Further, although any type of antenna is contemplated by the present disclosure, it should be understood that, in some embodiments, the antenna can be a slot antenna defined by a gap (e.g., a 0.1 mm gap to about a 5 mm gap) between the conductive housing and the printed circuit board. The slot antenna can have a signal that operates at a plurality of different frequency bands. For example, the slot antenna can operate at one or more global navigation satellite system (GNSS) (e.g., global positioning system (GPS), GLONASS, Galileo, etc.) frequency bands. For instance, the one or more global navigation satellite system frequency bands can include one or more GPS frequency bands (e.g., 1164 MHz to 1189 MHz, 1563 MHz to 1587 MHz, 1215 MHz to 1240 MHz,). However, since the wearable device must be compact enough to be worn, for instance, on the user's wrist, the distance of the antenna from the user's wrist may be small, which can, in some circumstances, impact the performance (e.g., radiation efficiency) of the slot antenna at the one or more GPS frequency bands. Specifically, there can be a tendency for too much signal to radiate through the cover directly into the user's wrist, which can negatively affect GPS performance.

It should also be understood that the antenna can operate at other frequency bands, such as those utilized in LTE, Wi-Fi, and Bluetooth applications as would be known to those of ordinary skill in the art.

Figure 14:
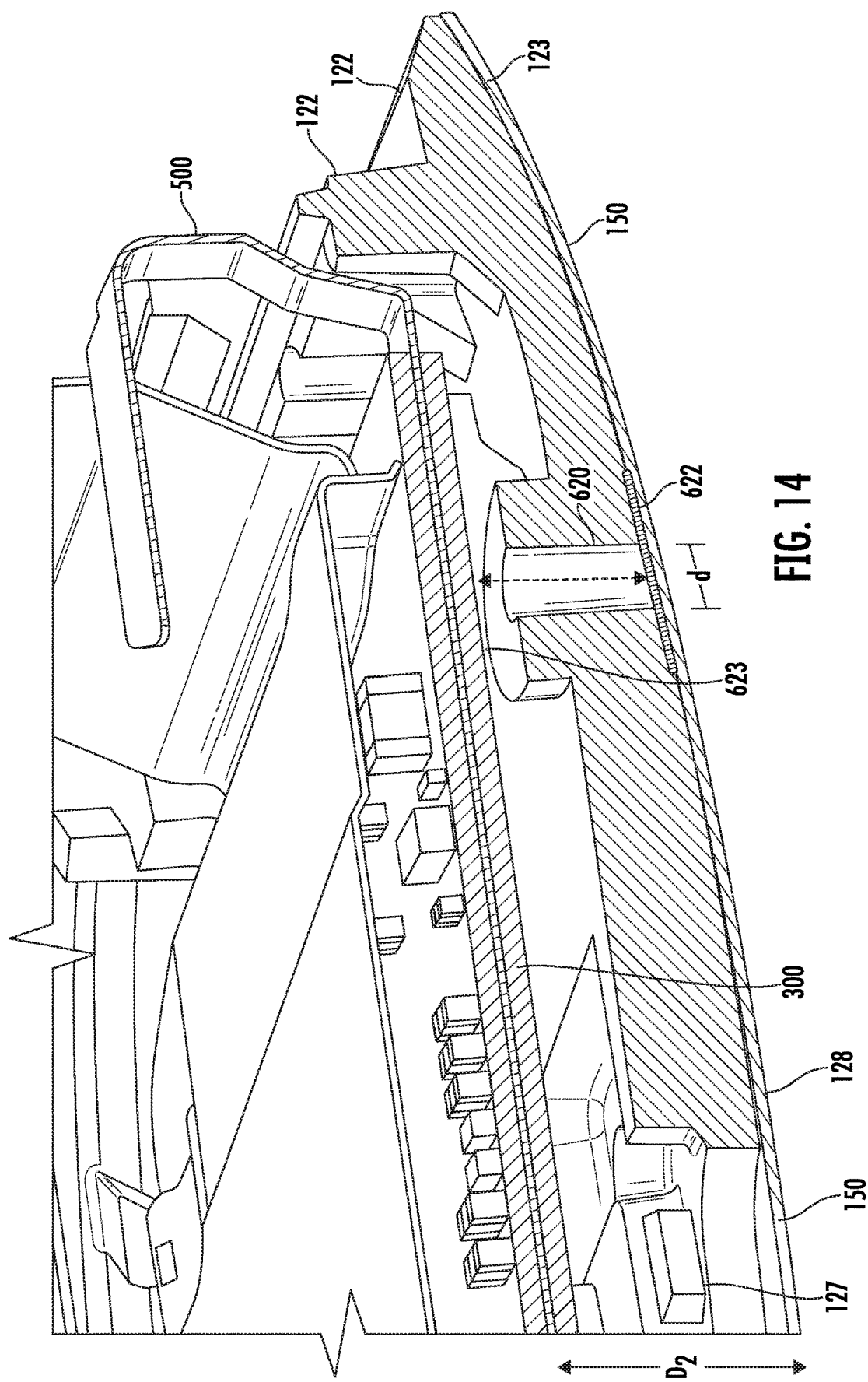
FIG. 14 depicts a zoomed-in version of FIG. 13 showing the slot antenna and opening in the bottom cover for connection of the parasitic element to the printed circuit board in more detail according to some implementations of the present disclosure.
Figure 15:
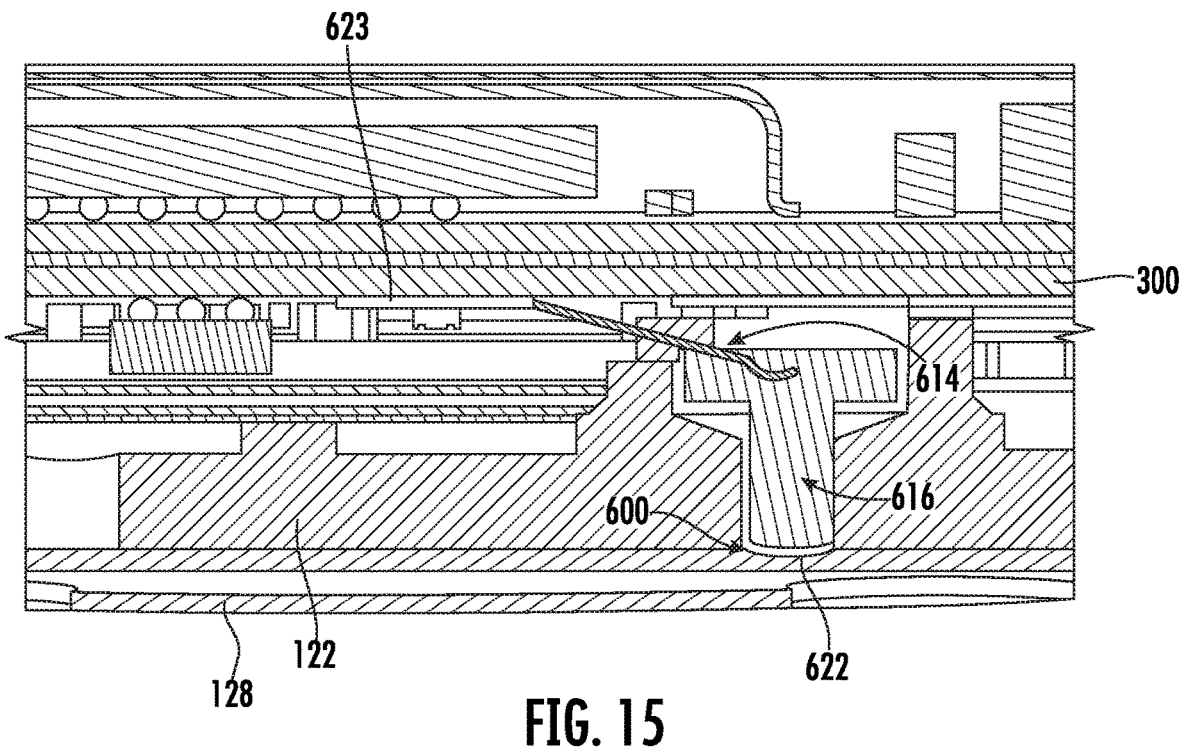
FIG. 15 depicts one configuration for mechanically connecting a parasitic element to a printed circuit board according to some implementations of the present disclosure.

Regardless of the particular application for which the antenna of the wearable device is to be utilized, the wearable device includes a parasitic element. The parasitic element can be located or positioned between an outer surface of the cover and the film, where the film and parasitic element, as well as other layers, form a label. The parasitic element is placed as close to the user's wrist as possible in order to direct the RF (e.g., GPS) signal away from the wrist and out into the open air. The parasitic element is also metal-based (e.g., contains a conductive ink) and has a low resistance (e.g., less than about 1 Ohm across the length of the parasitic element). Further, the distance between the parasitic element and the user's wrist and the distance between the parasitic element and the system ground (e.g., the printed circuit board (PCB) of the device) are precisely controlled to be within certain ranges, because if the parasitic element were too close to the PCB, the parasitic element would not radiate efficiently at the desired frequency(ies) and not enhance the performance of the antenna. For instance, the distance D1 (see FIG. 10) between the parasitic element and the user's wrist can range from about 0.15 millimeters to about 2.5 millimeters, such as from about 0.2 millimeters to about 2.25 millimeters, such as from about 0.25 millimeters to about 2 millimeters. Accordingly, the parasitic element is configured and arranged to be located at the distance D1 from the user's wrist when the wearable device is worn by the user. Meanwhile the distance D2 (see FIG. 14) between the parasitic element and the system ground at the PCB 300 can range from about 1.25 millimeters to about 3.5 millimeters, such as from about 1.5 millimeters to about 3 millimeters, such as from about 1.75 millimeters to about 2.75 millimeters.

Additionally, the parasitic element can be applied as one of a series of layers that are printed onto to a film that surrounds the outer surface of the cover of the wearable device, thereby forming a label. The film (e.g., a transparent in molded label (IML) film), parasitic element, and other layers of the label can then be stamped, formed to the shape of the outer surface of the cover, and insert molded onto the outer surface of the cover to provide a thin design where the parasitic element is close to the user's wrist and further from the system ground (e.g., at PCB 300) to improve antenna performance. For instance, the label including the parasitic element can have a thickness T (see FIG. 11) ranging from about 0.1 millimeters to about 0.5 millimeters, such as from about 0.125 millimeters to about 0.3 millimeters, such as from about 0.15 millimeters to about 0.25 millimeters. Further, the label can include a plurality of printed layers that can include, but may not be limited to, a decorative ink layer, a non-conductive making ink layer, a first gloss layer, a first insulating ink layer, a conductive ink layer, a second insulating ink layer, a second gloss layer, and a bonding layer, where each layer described can itself include a plurality of layers. The decorative ink layer is visible from the exterior of the wearable device through the transparent film, and the masking ink layer is utilized to hide the other layers of the label, such as the conductive ink layer that forms the parasitic element. The insulating ink layer(s) can add electrical stability to the parasitic element, and the gloss ink layer(s) can protect the conductive ink layer and the decorative ink layer from hot plastic during the insert molding process in which the various layers of the label including the parasitic element are joined to a plastic bottom cover of the wearable device. Further, the bonding layer bonds the label to the exterior surface of the plastic cover.

Further, the parasitic element can be electrically connected to the printed circuit board. For instance, the parasitic element can be electrically connected to a ground plane of the printed circuit board. For instance, the parasitic element can be direct current (DC) grounded to the printed circuit board at a first location thereon. Additionally, the parasitic element can be DC grounded to the printed circuit board at a second location thereon. The first location and the second location can be spaced apart from one another along the printed circuit board. Furthermore, the printed circuit board can include a first fastener (e.g., spring clip, booster pin, compression spring, etc.) at the first location and a second fastener (e.g., spring clip, booster pin, compression spring, etc.) at the second location to couple the parasitic element to the printed circuit board via a first opening and a second opening at the first location and the second location, respectively. For example, a first contact of the parasitic element and/or a second contact of the parasitic element can be mechanically coupled and/or electrically coupled to the printed circuit board via the first fastener and the second fastener, respectively, rather than via a solder connection.

The parasitic element can be radio frequency (RF) grounded to the printed circuit board at multiple different locations. In this manner, the antenna (e.g., a slot antenna) induces one or more electrical currents on the parasitic element when operating at the one or more frequency bands, which can improve performance (e.g., radiation efficiency) of the antenna at the one or more frequency bands. Further, the parasitic element can improve the radiation efficiency of the antenna at the one or more frequency bands by at least about 2 decibels, such as by at least about 3 decibels, such as by at least about 4 decibels.

The parasitic element can be electrically grounded to the printed circuit board. For instance, in some implementations, the parasitic element can be RF grounded to the printed circuit board multiple locations. In this manner, the antenna (e.g., a slot antenna) induces one or more electrical currents on the parasitic element when operating at the one or more frequency bands, which can improve performance (e.g., radiation efficiency) of the antenna at the one or more frequency bands. Further, the parasitic element can improve the radiation efficiency of the antenna at the one or more frequency bands by at least about 2 decibels, such as by at least about 3 decibels, such as by at least about 4 decibels.

In some implementations, the parasitic element can be electrically grounded to the printed circuit board via a matching circuit. It should be understood that the matching circuit can include various electronic components (e.g., capacitors, inductors, resistors, switching devices, etc.) to facilitate electrically grounding the parasitic element to the printed circuit board. In alternative implementations, the parasitic element can be direct current (DC) grounded to the printed circuit board.

Referring now to the FIGS., FIG. 1 depicts a wearable device 100 according to some implementations of the present disclosure. As shown, the wearable device 100 can be worn, for instance, on a wrist 102 of a user. For instance, the wearable device 100 can include a band 104 and a housing assembly 110. The housing assembly 110 can be coupled to the band 104. In this manner, the band 104 can be fastened to the wrist 102 of the user to secure the housing assembly 110 to the wrist 102 of the user.

In some implementations, the wearable device 100 can include a display 112 that can display content (e.g., time, date, etc.) to the user. In some implementations, the display 112 can include an interactive display (e.g., touchscreen or touch-free). In such implementations, the user can interact with the wearable device 100 via the display 112 to control operation of the wearable device 100. Alternatively, or additionally, the wearable device 100 can include one or more input devices 114 that can be manipulated by the user to interact with the wearable device 100. For instance, the one or more input devices 114 can include a mechanical button that can be manipulated (e.g., pressed) to interact with the wearable device 100. In some implementations, the one or more input devices 114 can be manipulated to control operation of a backlight (not shown) associated with the display 112. It should be understood that the one or more input devices 114 can be configured to allow the user to interact with the wearable device 100 in any suitable manner. For instance, in some implementations, the one or more input devices 114 can be manipulated by the user to navigate through one or more menus on the display 112.

In some implementations, the wearable device 100 can be designed to be worn (e.g., continuously) by the user. When worn, the wearable device 100 can gather data regarding activities performed by the user, or regarding the user's physiological state. Such data may include data representative of the ambient environment around the user or the user's interaction with the environment. For example, the data can include motion data regarding the user's movements, ambient light, ambient noise, air quality, etc., and/or physiological data obtained by measuring various physiological characteristics of the user, such as heart rate, perspiration levels, body temperature, and the like.

Figure 2:
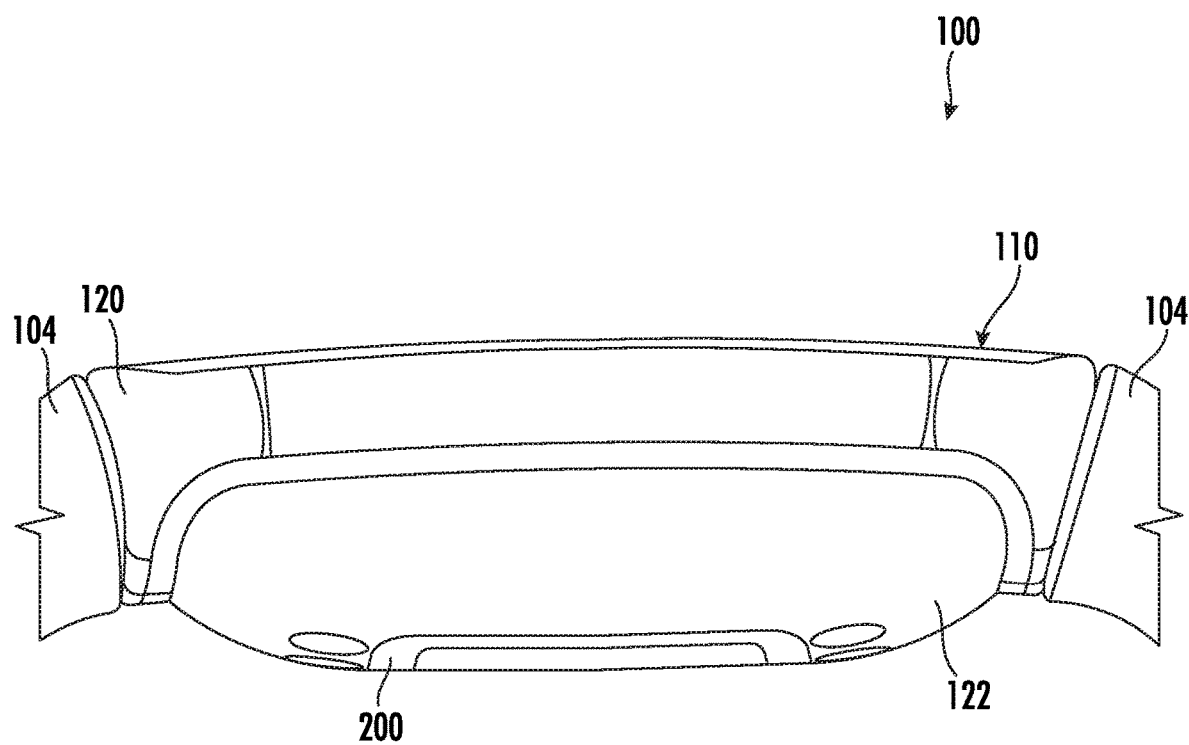
FIG. 2 depicts a conductive housing of a wearable device according to some implementations of the present disclosure.

Referring now to FIG. 2, a side view of the housing assembly 110 of the wearable device 100 is provided according to some implementations of the present disclosure. As shown, the housing assembly 110 can include a conductive housing 120. The conductive housing 120 can be attached to the band 104 that is used to secure the housing assembly 110 to the wrist 102 (FIG. 1) of the user. The housing assembly 110 can include a bottom cover 122 coupled to the conductive housing 120. In some implementations, the bottom cover 122 can be coupled to the bottom of the conductive housing 120. In this manner, the bottom cover 122 can contact (e.g., touch) the wrist 102 (FIG. 1) of the user when the housing assembly 110 is secured to the wrist 102 of the user via the band 104.

The conductive housing 120 can include any suitable conductive material. For instance, in some implementations, the conductive housing 120 can include a metal housing. The bottom cover 122 can include an insulating material. For instance, in some implementations, the bottom cover 122 can include a plastic cover.

In some implementations, the wearable device 100 can include an electrocardiogram (ECG) electrode 200. As shown, the ECG electrode 200 can be positioned within an opening (e.g., cutout) defined by the bottom cover 122. In this manner, the ECG electrode 200 can be positioned adjacent the wrist 102 (FIG. 1) of the user when the housing assembly 110 is secured to the wrist 102 of the user via the band 104. When the ECG electrode 200 is in sufficient proximity to the wrist 102 of the user, the ECG electrode 200 can be electrically connected to the wrist 102 of the user. Furthermore, it should be understood that the wearable device 100 can determine one or more health metrics (e.g., heart rate) of the user based, at least in part, on data obtained via the ECG electrode 200 when the ECG electrode 200 is electrically connected to the wrist 102 of the user.

Figure 3:
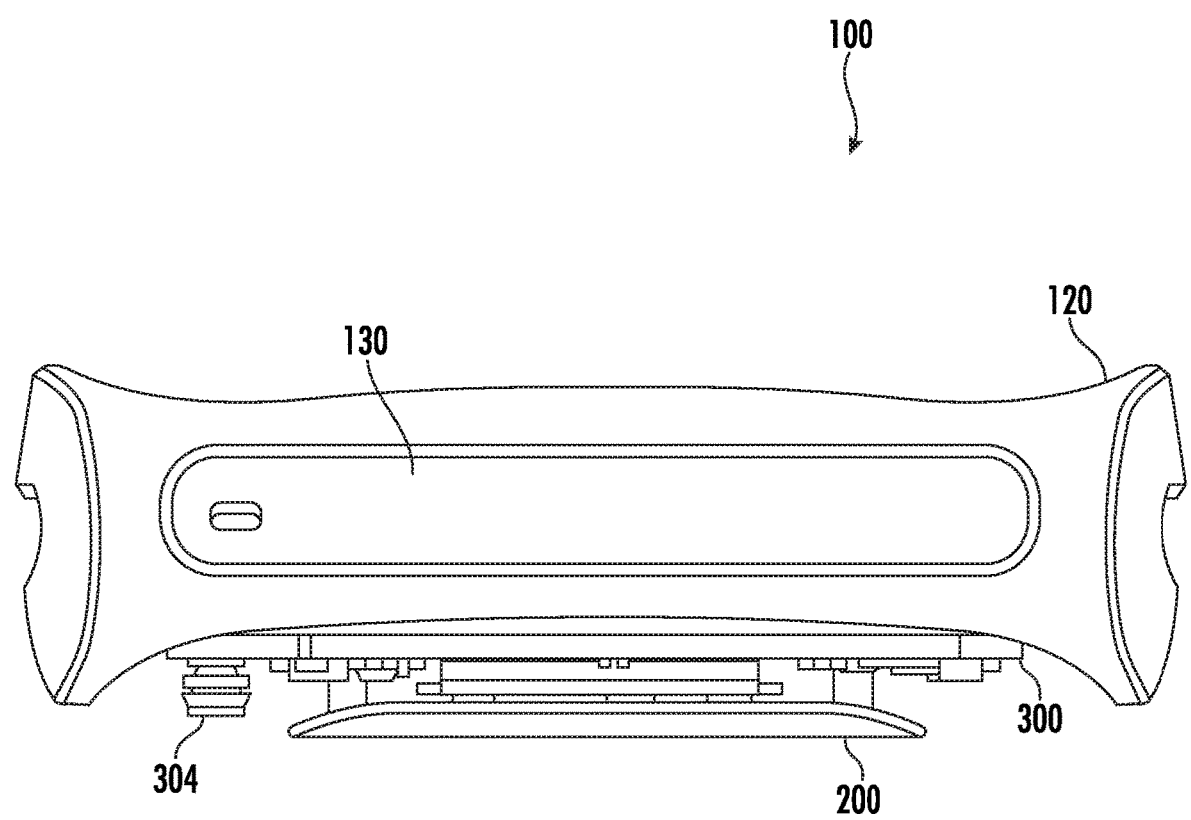
FIG. 3 depicts a side view of a wearable device with a bottom cover of a housing assembly of the wearable device removed according to some implementations of the present disclosure.
Figure 4:
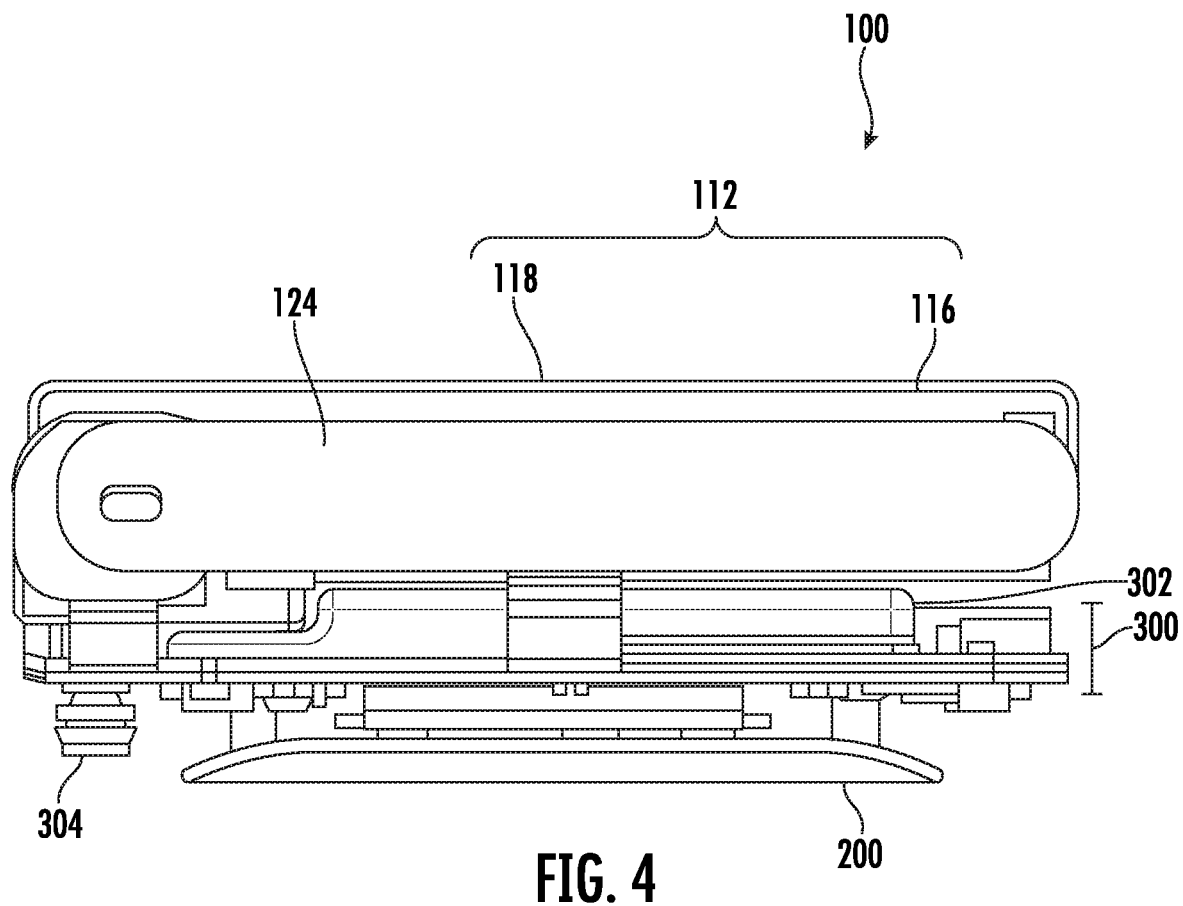
FIG. 4 depicts the side view of a wearable device with a housing assembly of the wearable device removed according to some implementations of the present disclosure.

Referring now to FIGS. 3 and 4, a side view of the wearable device 100 is provided according to some implementations. FIG. 3 depicts a side view of the wearable device 100 with the bottom cover 122 (FIG. 2) removed. FIG. 4 depicts a side view of the wearable device 100 with the housing assembly 110 (FIG. 2) removed. As shown, the display 112 can, in some implementations, include display traces (e.g., ITO coating) 116 and touch traces (e.g., ITO coating) 118. The wearable device 100 can also include one or more electrodes 124 to collect and store data regarding any number of parameters (electrodermal activity, etc.) that can be communicated to the user.

The wearable device 100 can include a printed circuit board 300 disposed within the housing assembly 110 (see FIG. 2). For instance, in some implementations, a first portion of the printed circuit board 300 can be positioned within the conductive housing 120 and a second portion of the printed circuit board 300 can be positioned within the bottom cover 122 (see FIG. 2). The printed circuit board 300 can include a plurality of electronic components (not shown) disposed thereon. In some implementations, the printed circuit board 300 can include a shielding can 302 covering at least a portion of the printed circuit board 300. In this manner, the shielding can 302 can cover one or more electronic components of the plurality of electronic components disposed on the printed circuit board 300. Alternatively, or additionally, the printed circuit board 300 can include one or more charging pins 304. In this manner, the wearable device 100 can be coupled to a charging circuit (not shown) via the one or more charging pins 304 to facilitate charging of an energy storage device (e.g., battery) of the wearable device 100.

In some implementations, the conductive housing 120 can define an opening (e.g., cutout) for one or more electrodes 124. In this manner, the one or more electrodes 124 can be visible to the user. In some implementations, the one or more electrodes 124 can include an electrodermal activity (EDA) electrode. In such implementations, the user can contact (e.g., touch) the one or more electrodes 124 to facilitate measuring one or more health metrics (e.g., heart-rate, blood pressure, EDA etc.) of the user. It should be understood that the one or more electrodes 124 can be electrically coupled to the printed circuit board 300.

Figure 5:
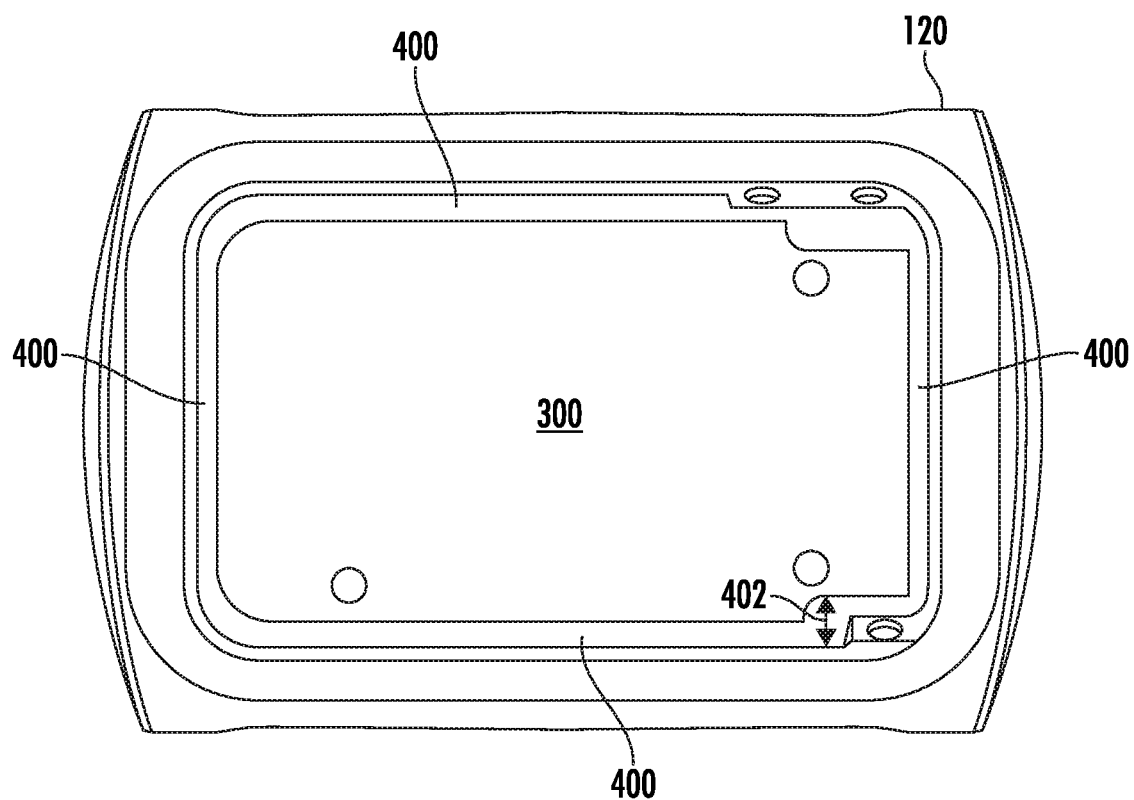
FIG. 5 depicts a printed circuit board positioned within a conductive housing of a wearable device according to some implementations of the present disclosure.

Referring now to FIG. 5, the printed circuit board 300 can be positioned relative to the conductive housing 120 such that a gap 400 is defined between the conductive housing 120 and the printed circuit board 300. The gap 400 can extend around a portion of or the entire perimeter of the printed circuit board 300. Stated another way, at least some portion of the printed circuit board 300 cannot contact (e.g., touch) the conductive housing 120.

In some implementations, a width 402 of the gap 400 defined between the conductive housing 120 and the printed circuit board 300 can range from about 0.5 millimeters to about 10 millimeters, such as from about 1 millimeter to about 7.5 millimeters, such as from about 1.5 millimeters to about 5 millimeters. In some implementations, the width 402 of the gap 400 can vary around the perimeter of the printed circuit board 300. For instance, the width 402 of the gap 400 between the conductive housing 120 and the printed circuit board 300 at a first portion of the perimeter of the printed circuit board 300 can be different (e.g., wider, narrower) than the width 402 of the gap 400 between the conductive housing 120 and the printed circuit board 300 at a second portion of the perimeter of the printed circuit board 300. In some implementations the printed circuit board 300 can touch the conductive housing 120.

Figure 6:
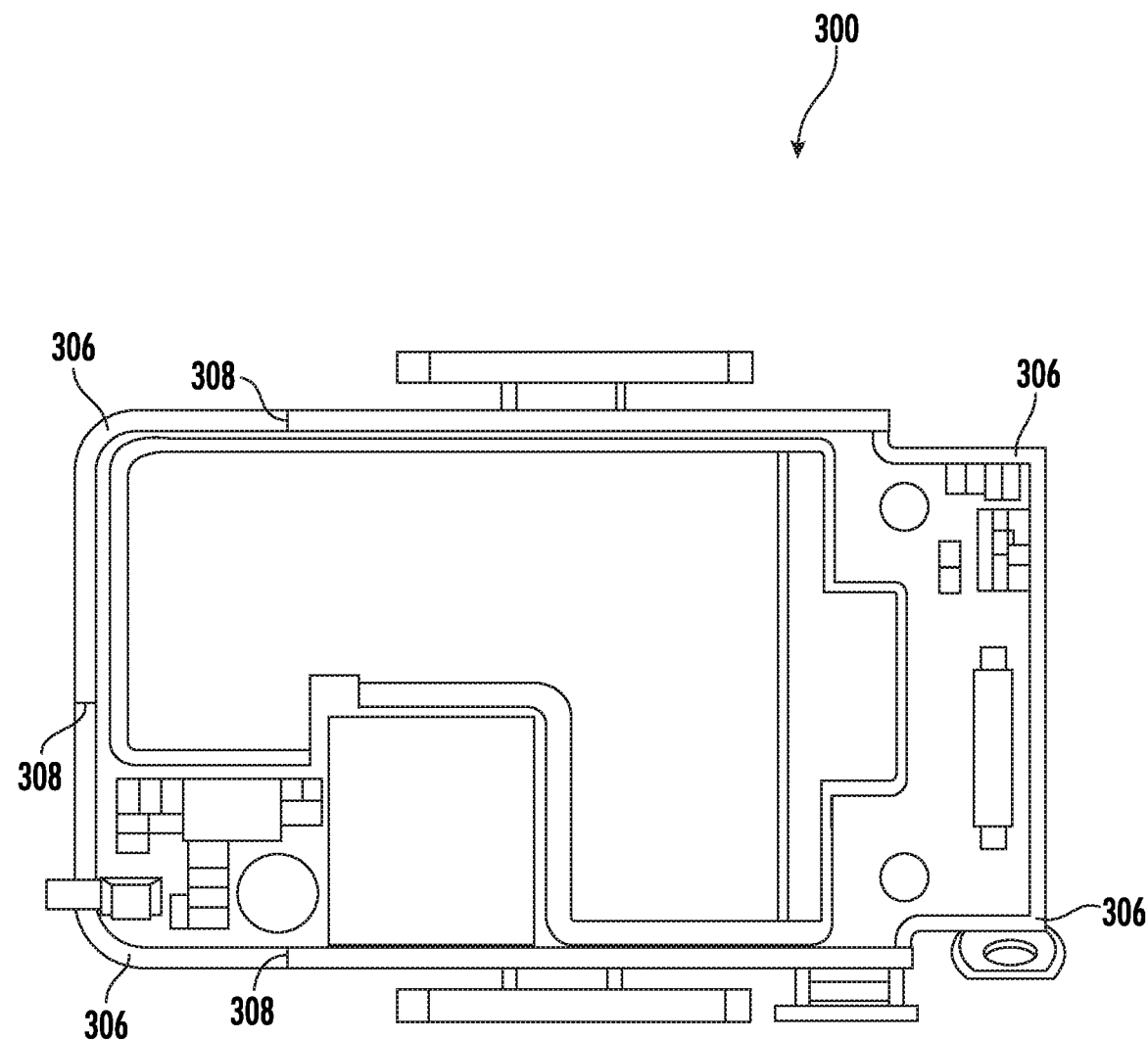
FIG. 6 depicts a printed circuit board of a wearable device according to some implementations of the present disclosure.
Figure 7:
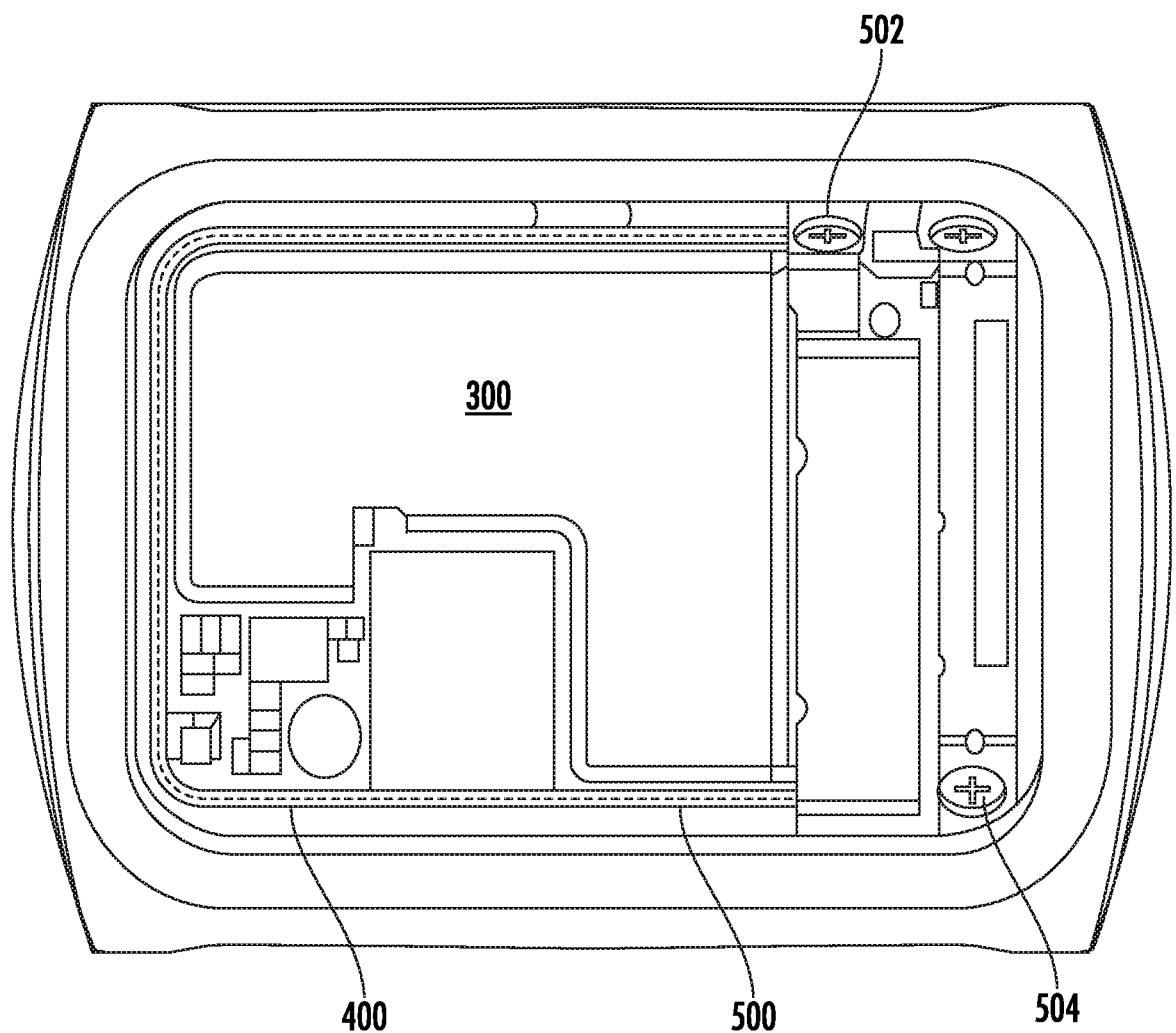
FIG. 7 depicts a slot antenna defined by a gap between a conductive housing and a printed circuit board of a wearable device according to some implementations of the present disclosure.

Referring now to FIGS. 6 and 7, the perimeter of the printed circuit board 300 can, in some implementations, include a copper free or ground keep-out region 306. It should be understood that the ground keep-out region 306 can include a region of the printed circuit board 300 where electronic components (e.g., resistors, capacitors, etc.) cannot be placed. In some implementations, a width 308 of the ground keep-out region 306 of the printed circuit board 300 can range from 0.1 millimeters to about 2 millimeters, such as from about 0.2 millimeters to about 1.9 millimeters, such as from about 0.3 millimeters to about 1.8 millimeters. As will be discussed below, the ground keep-out region 306 can act as an electrical gap. In some implementations, the ground keep-out region 306 will be around the entire perimeter of the printed circuit board 300. In some implementations the ground keep-out region 306 will only be around a portion of the perimeter of the printed circuit board 300.

In some implementations, an antenna, such as a slot antenna 500 (denoted by dashed line) can be defined by the gap 400 between the conductive housing 120 and the printed circuit board 300. Furthermore, in some implementations, the antenna 500 can be further defined by an electrical gap that spans the width 308 of the ground keep-out region 306 of the printed circuit board 300. In such implementations, the width of the slot antenna 500 can span the width 402 (FIG. 5) of the gap 400 and the width 308 of the ground keep-out region 306 of the printed circuit board 300. For instance, in some implementations, the width of the slot antenna 500 can range from about 0.5 millimeters to about 10 millimeters, such as from about 0.75 millimeters to about 9 millimeters, such as from about 1 millimeters to about 8 millimeters.

The slot antenna 500 can be operable at a plurality of different frequency bands. For instance, the slot antenna 500 can be operable at one or more Global Navigation Satellite System (GNSS) frequency bands. In some implementations, the one or more GNSS frequency bands can include one or more GPS frequency bands. The one or more GPS frequency bands can include at least one of a first GPS frequency band ranging from about 1164 Megahertz (MHz) to about 1189 MHz, a second GPS frequency band ranging from about 1563 MHz to about 1587 MHz, and a third GPS frequency band ranging from about 1215 MHz to about 1240 MHz. Furthermore, in addition to the one or more GPS frequency bands, the antenna 500 can be configured to radiate at one or more frequency bands associated with cellular communications (e.g., 4G, 5G) or wireless local area communications (e.g., Wi-Fi or personal area networks (e.g., Bluetooth)). It should be understood however that the slot antenna 500 can be operable at frequency bands associated with any suitable communication standard.

In some implementations, the slot antenna 500 can include a first grounding contact 502 and a second grounding contact 504. The first grounding contact 502 can couple the conductive housing 120 to the ground of the printed circuit board 300 at a first location. Conversely, the second grounding contact 504 can couple the conductive housing 120 to the ground of the printed circuit board 300 at a second location. In some implementations, the first location and the second location can correspond to opposing sides of the printed circuit board 300. It should be understood however that the first grounding contact 502 and the second grounding contact 504 can be coupled to the ground of the printed circuit board 300 at any suitable location to adjust a length of the slot antenna 500. For instance, the first grounding contact 502 and the second grounding contact 504 can be positioned to shorten the slot antenna 500. Alternatively, the first grounding contact 502 and the second grounding contact 504 can be positioned to lengthen the slot antenna 500.

Figure 8:
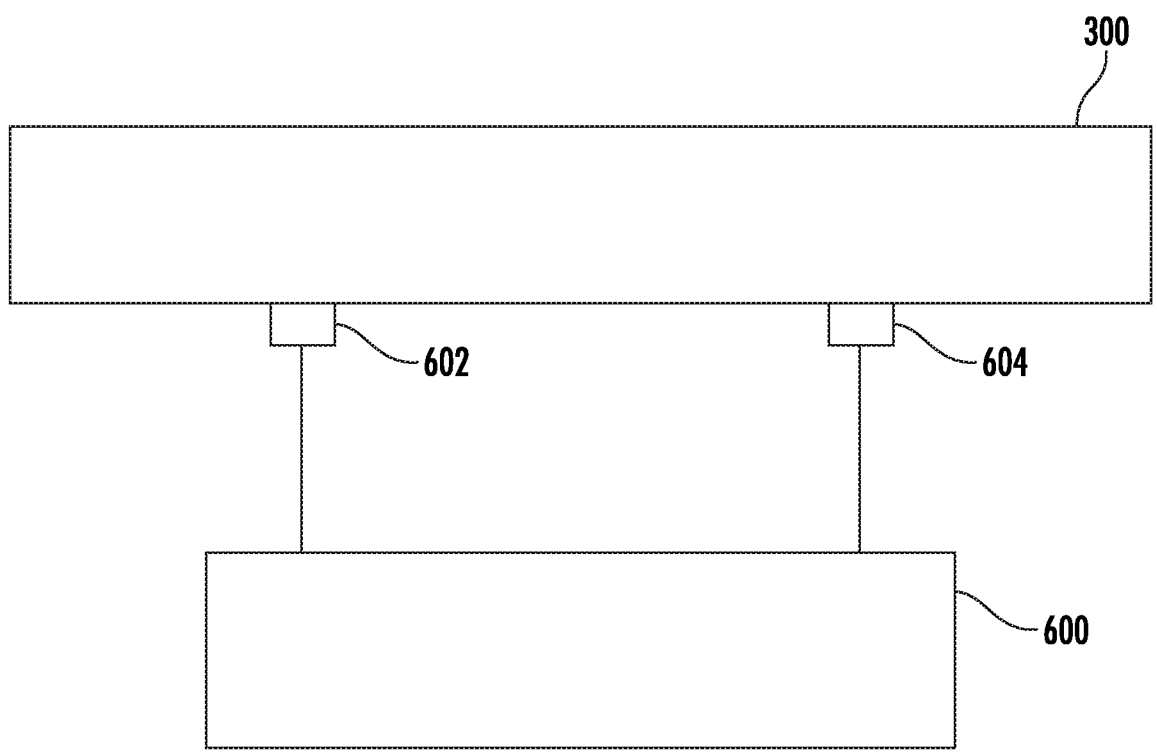
FIG. 8 depicts a parasitic element grounded to a printed circuit board of a wearable device according to some implementations of the present disclosure.
Figure 9:
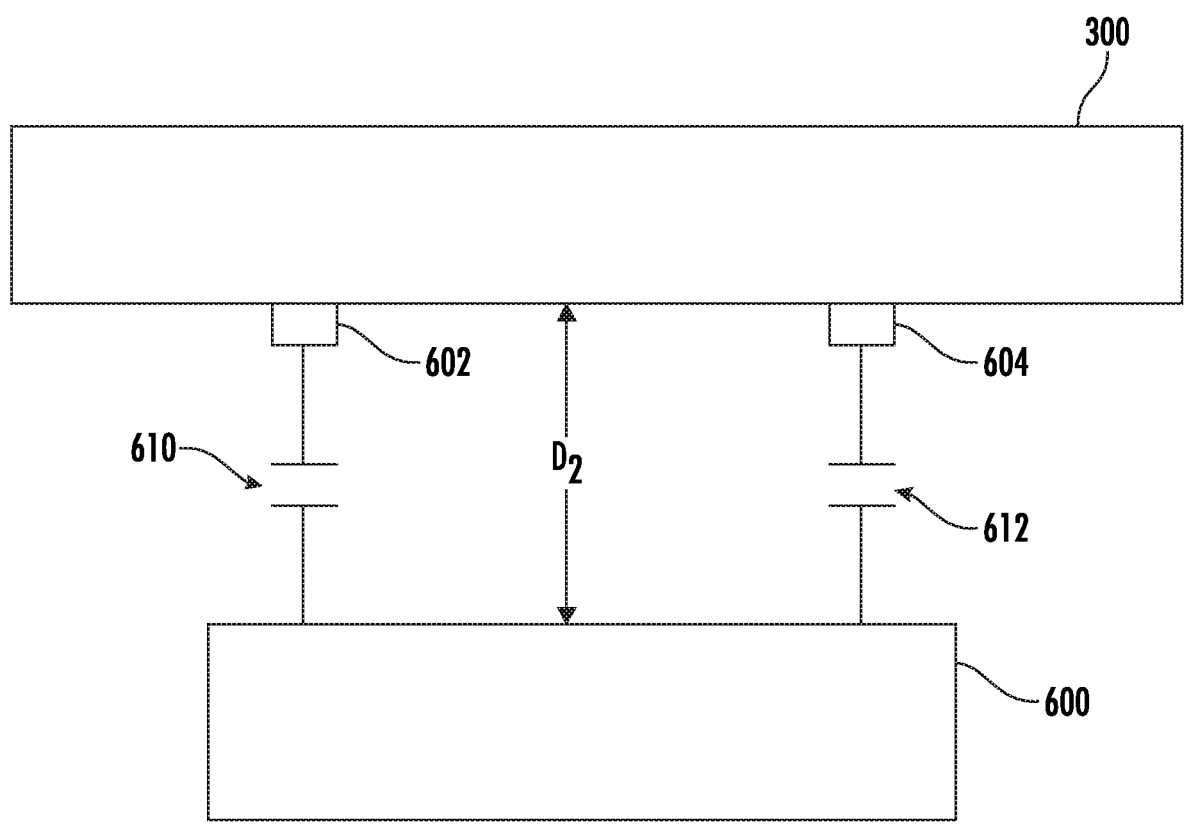
FIG. 9 depicts a parasitic element radio frequency grounded to a printed circuit board of a wearable device according to some implementations of the present disclosure.

Referring now to FIGS. 8 and 9, a parasitic element 600 of a wearable device (e.g., wearable device 100 of FIG. 1) is provided according to some implementations of the present disclosure. The parasitic element 600 can be configured to increase the radiation of the RF signal when the wearable device 100 is on the user's wrist. In some implementations, the parasitic element 600 can be disposed entirely within the housing assembly 110 (FIG. 1) of the wearable device 100. In alternative implementations, the parasitic element 600 can be partially positioned within the housing assembly 110. For instance, a first portion of the parasitic element 600 can be positioned within the housing assembly 110, whereas a second portion of the parasitic element 600 can be positioned outside of the housing assembly 110.

The parasitic element 600 can be electrically connected to the printed circuit board 300. For instance, the parasitic element 600 can be electrically connected to a ground plane of the printed circuit board 300. In some implementations, the parasitic element 600 can be DC grounded to the printed circuit board 300 at multiple locations. For instance, the parasitic element 600 can be DC grounded to the printed circuit board 300 at a first location 602 thereon and a second location 604 thereon. As shown, the first location 602 and the second location 604 can be spaced apart from one another along the printed circuit board 300. It should be understood that, in some implementations, the parasitic element 600 can be DC grounded to the printed circuit board 300 at more than two locations (e.g., first location 602, second location 604) thereon.

In some implementations, the parasitic element 600 can be coupled to the printed circuit board 300 via one or more matching circuits. For instance, in some implementations the parasitic element 600 can be RF grounded to the printed circuit board 300 at the first location 602 thereon via a first RF bypass capacitor 610. Additionally, the parasitic element 600 can be RF grounded to the printed circuit board 300 at the second location 604 thereon via a second RF bypass capacitor 612. It should be understood that the RF bypass capacitors (e.g., first RF bypass capacitor 610 and second RF bypass capacitor 612) can leave the parasitic element 600 electrically isolated to electrical ground at direct current and low frequencies (e.g., non-RF frequencies). In some implementations, the parasitic element 600 can be coupled to the printed circuit board at the first location 602 through a first matching circuit that can consist of one or more inductors and capacitors. Additionally, the parasitic element 600 can be coupled to the printed circuit board 300 at the second location 604 through a second matching circuit that can consist of one or more inductors and capacitors.

The parasitic element 600 can improve performance (e.g., radiation efficiency) of the slot antenna 500 at the one or more frequency bands. For instance, since the parasitic element 600 is electrically coupled (e.g., radio frequency grounded, DC grounded) to the printed circuit board 300 at multiple locations (e.g., first location 602, second location 604), the slot antenna 500 can induce one or more electrical currents on the parasitic element 600 when the slot antenna 500 is operating at the one or more frequency bands. It should be understood that the slot antenna 500 inducing one or more electrical currents on the parasitic element 600 can improve performance (e.g., radiation efficiency) of the slot antenna 500 at the one or more frequency bands. For instance, in some implementations, the radiation efficiency of the antenna 500 can increase by at least 2 decibels, such as by at least about 3 decibels, such as at least by about 4 decibels due, at least in part, to the parasitic element 600 being electrically coupled to the printed circuit board 300 at multiple locations (e.g., first location 602, second location 604).

In some implementations, the printed circuit board 300 can include a first fastener (e.g., spring clip) at the first location 602 thereon and a second fastener at the second location thereon. In this manner, the parasitic element 600 can be mechanically coupled to the printed circuit board 300 at the first location 602 and the second location 604 via the first fastener and the second fastener, respectively, as discussed in more detail below.

Figure 10:
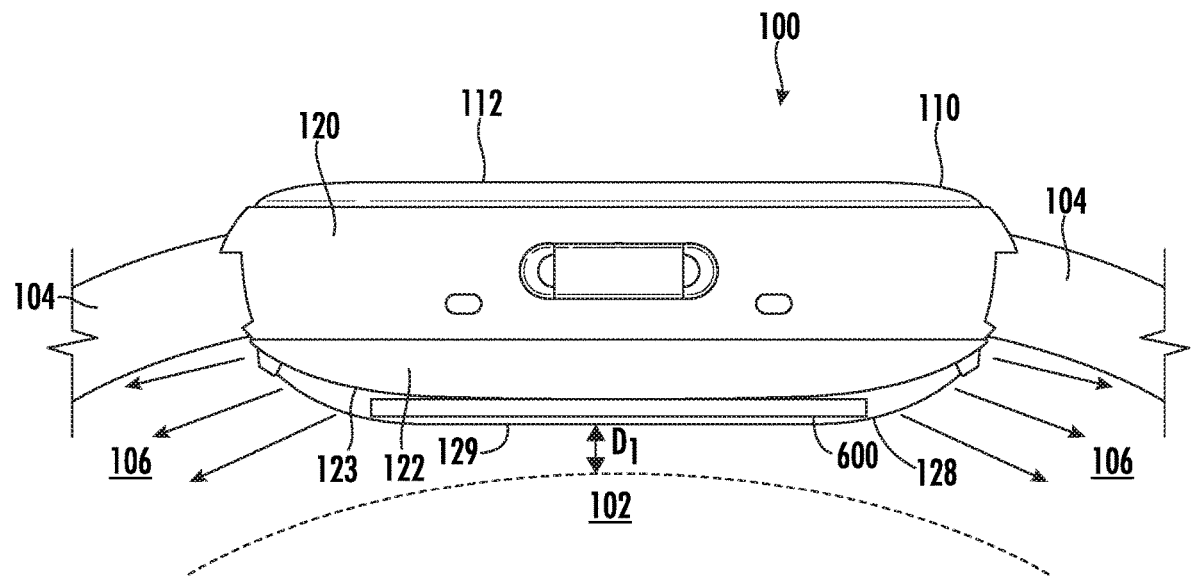
FIG. 10 depicts a side view of a wearable device including a parasitic element disposed between a film and a bottom cover of housing assembly according to some implementations of the present disclosure.

Referring now to FIG. 10, a cross-sectional view of the wearable device 100 according to some implementations of the present disclosure is shown. The wearable device 100 includes a parasitic element 600 which forms one layer of the label 150 and is disposed between a film 128 and a bottom cover 122 of a housing assembly 110 according to some implementations of the present disclosure. Specifically, the parasitic element 600 can be disposed between an outer surface 123 of the bottom cover 122, which can be formed from a plastic material, and the film 128. Further, the bottom cover 122 is coupled to a conductive housing 120, which can be attached to the band 104 that is used to secure the housing assembly 110 to the wrist 102 the user. The parasitic element is positioned a distance D1 away from the user's wrist 102. The distance D1 between the parasitic element 600 and the user's wrist 102 can range from about 0.15 millimeters to about 2.5 millimeters, such as from about 0.2 millimeters to about 2.25 millimeters, such as from about 0.25 millimeters to about 2 millimeters in order to improve the radiation efficiency of the slot antenna 500 of the wearable device 100.

Figure 11:
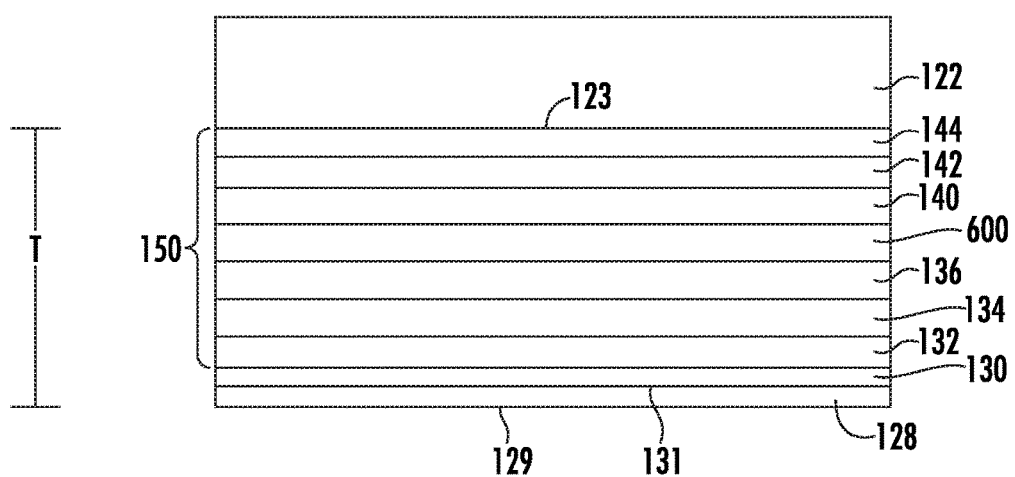
FIG. 11 depicts a zoomed in cross-sectional view of the label, including the film and the parasitic element, and the bottom cover of FIG. 10 according to some implementations of the present disclosure.

Referring now to FIG. 11, a zoomed in cross-sectional view of the bottom cover 122 of FIG. 10 and the label 150 which includes the film 128, the parasitic element 600, as well as additional layers. The label (e.g., in mold label (IML)) 150 can be insert molded onto the outer surface 123 of the bottom cover 122 as shown after various additional layers and the parasitic element 600 have been printed or otherwise applied to the film 128. The overall thickness T of the label 150, which includes the film 128, the parasitic element 600 and additional layers, can range from about 0.1 millimeters to about 0.5 millimeters, such as from about 0.125 millimeters to about 0.3 millimeters, such as from about 0.15 millimeters to about 0.25 millimeters.

Each layer of the label 150 will now be discussed in more detail, where it is to be understood that each layer described hereafter can itself include more than one layer, such as 2 or more layers, such as 3 more layers, such as 4 or more layers. In some embodiments, each layer can be comprised of 2 to 10 layers, while in other embodiments, each layer may include only 1 individual layer. Further, the overall resistance across the length of the parasitic element 600 can be less than about 2.5 Ohms, such as less than about 1.5 Ohms, such as less than about 1 Ohm.

To form the label 150, first, a decorative ink layer 130 can be applied to the film 128. Because the film 128 is transparent, the decorative ink layer 130 can be visible to a user or viewer from the bottom 129 of the wearable device 100. It should be understood that the decorative ink layer 130 may only be printed or applied to a portion of the film 128 depending on the particular designs, text, etc. that it is desired for a user or other viewer of the wearable device 100 to see. Any suitable ink of any desired color can be used for the decorative ink layer 130, with the understanding that the decorative ink layer 130 is non-conductive.

Next, a non-conductive masking ink layer 132 can be applied on top of the decorative ink layer 130. The non-conductive masking ink layer 132 can be used to mask, hide, or obscure the other layers discussed below from the user or any other viewers of the bottom 129 of the wearable device 100, where such masking can enhance or highlight the decorative ink layer 130. Further, the non-conductive masking ink layer 132 may not be applied on top of the entire inner surface 131 of the film 128 and intervening layers because, as discussed in more detail below, various openings 125 (see FIG. 12) may be needed for facilitating external charging of the wearable device 100 or where openings 126 (see FIG. 12) may need to be exposed where sensors 127 may be placed (see FIGS. 12-14). The non-conductive masking ink layer 132 can be any suitable color, so long as the non-conductive masking ink layer 132 hides the layers that may be printed or applied on top of it. In some embodiments, the non-conductive masking ink layer 132 is black, although it is to be understood that the color of the non-conductive masking ink layer 132 is not limited to black.

Further, a first gloss layer 134 can be applied on top of the non-conductive masking ink layer 132. In one particular embodiment, the first gloss layer 134 can include four separate gloss layers. The first gloss layer 134 can be used to protect any of the various layers of the label 150 from heat damage when the label 150 is applied to the bottom cover 122 via insert molding. In some embodiments, the first gloss layer 134 can be completely transparent. Additionally, the first gloss layer 134 may not be applied on top of the entire inner surface 131 of the film 128 and any intervening layers because, as discussed in more detail below, various openings 125 may be needed for facilitating external charging of the wearable device 100 or where openings 126 may be needed to be expose where sensors 127 may be placed (see FIGS. 12-14).

Next, a first insulating ink layer 136 can be applied on top of the first gloss layer 134. The first insulating ink layer 136 (as well as the second insulating ink layer 140 discussed below) can be used to sandwich and protect the parasitic element 600, which is a conductive ink layer or layers, from interference with the other layers of the label 150. The first insulating ink layer 136 can be a dielectric ink. In some embodiments, the first insulating ink layer 136 can be completely transparent. Further, the first insulating ink layer 136 can include from about 40 wt. % to about 90 wt. %, such as from about 45 wt. % to about 85 wt. %, such as from about 50 wt. % to about 50 wt. % of a glycol ether based on the total weight of the first insulating ink layer 136. In one embodiment, the glycol ether can be diethylene glycol ethyl acetate, although it should be understood that any other suitable glycol ethers can be used as known to one of ordinary skill in the art. Additionally, the first insulating ink layer 136 may not be applied on top of the entire inner surface 131 of the film 128 and any intervening layers because, as discussed in more detail below, various openings 125 may be needed for facilitating external charging of the wearable device 100 or where openings 126 may be needed to be expose where sensors 127 may be placed (see FIGS. 12-14).

After the first insulating ink layer 136 is applied, a conductive ink layer that forms the parasitic element 600 can be applied thereon. The conductive ink layer can be metallic and serves as the parasitic element 600 that facilitates the enhancement of the slot antenna 500 of the wearable device 100 resulting in stronger RF signals 106. In one particular embodiment, the conductive ink layer that forms the parasitic element 600 can include two separate conductive ink layers. The conductive ink layer can be a metallic paste. For instance, the conductive ink layer can include silver, copper, gold, aluminum, cobalt, nickel, tungsten, zinc, rhodium, iridium, ruthenium, osmium, palladium, platinum, or a combination thereof. However, it is also to be understood that non-metallic materials that are conductive can also be used. For example, the conductive ink layer can be in the form of a graphite paste in some embodiments. The metallic or conductive non-metallic material can be present in the conductive ink layer in an amount ranging from about 40 wt. % to about 85 wt. %, such as from about 45 wt. % to about 80 wt. %, such as from about 50 wt. % to about 75 wt. % based on the total weight of the conductive ink layer. The conductive ink layer can also include a polyester resin, an ethoxyline resin, an amorphous silica, or a combination thereof. The polyester resin can be present in an amount ranging from about 1 wt. % to about 25 wt. %, such as from about 2.5 wt. % to about 20 wt. %, such as from about 5 wt. % to about 15 wt. % based on the total weight of the conductive ink layer. Further, the ethoxyline resin can be present in an amount ranging from about 0.05 wt. % to about 5 wt. %, such as from about 0.075 wt. % to about 4 wt. %, such as from about 0.1 wt. % to about 3 wt. % based on the total weight of the conductive ink layer. Additionally, the conductive ink layer may not be applied on top of the entire inner surface 131 of the film 128 and any intervening layers because, as discussed in more detail below, various openings 125 may be needed for facilitating external charging of the wearable device 100 or where openings 126 may be needed to be expose where sensors 127 may be placed (see FIGS. 12-14).

In addition, a second insulating ink layer 140 can be applied on top of the conductive ink layer that forms the parasitic element 600. The second insulating ink layer 140 (as well as the first insulating ink layer 136 discussed above) can be used to sandwich and protect the conductive ink layer forming the parasitic element 600 from interference with the other layers of the label 150. The second insulating ink layer 140 can be a dielectric ink. In some embodiments, the second insulating ink layer 140 can be completely transparent. Further, the second insulating ink layer 140 can include from about 40 wt. % to about 90 wt. %, such as from about 45 wt. % to about 85 wt. %, such as from about 50 wt. % to about 50 wt. % of a glycol ether. In one embodiment, the glycol ether can be diethylene glycol ethyl acetate, although it should be understood that any other suitable glycol ethers can be used as known to one of ordinary skill in the art. Additionally, the second insulating ink layer 140 may not be applied on top of the entire inner surface 131 of the film 128 and any intervening layers because, as discussed in more detail below, various openings 125 may be needed for facilitating external charging of the wearable device 100 or where openings 126 may be needed to be expose where sensors 127 may be placed (see FIGS. 12-14). Moreover, the second insulating ink layer 140 may not be applied over a portion of the conductive ink layer so that the resistance of the parasitic element 600 can be measured at one or more exposed sections 624 after injection molding of the bottom cover 122 and prior to final assembly of the wearable device 100 and so that the conductive ink layer forming the parasitic element 600 can be connected to the printed circuit board 300 at one or more exposed sections 626 (see FIG. 12).

Additionally, a second gloss layer 142 can be applied on top of the second insulating ink layer 140. In one particular embodiment, the second gloss can include two separate gloss layers. The second gloss layer 142 can be used to protect any of the various layers of the label 150 from heat damage when the label 150 is applied to the bottom cover 122 via insert molding. In some embodiments, the second gloss layer 142 is completely transparent. Further, the second gloss layer 142 may not be applied on top of the entire inner surface 131 of the film 128 and any intervening layers because, as discussed in more detail below, various openings 125 may be needed for facilitating external charging of the wearable device 100 or where openings 126 may be needed to be expose where sensors 127 may be placed (see FIG. 12). Moreover, the second gloss layer 142 may not be applied over a portion of the conductive ink layer and any intervening layers so that the resistance of the parasitic element 600 can be measured at one or more exposed sections 624 after injection molding of the bottom cover 122 and prior to final assembly of the wearable device 100 and so that the conductive ink layer forming the parasitic element 600 can be connected to the printed circuit board 300 at one or more exposed sections 626 (see FIG. 12).

Next, a bonding layer 144 can be applied on top of the second gloss layer 142. The bonding layer 144 can be used to enhance the adhesion of the label 150 to the outer surface 123 of the bottom cover 122 during the insert molding process. Further, it is to be understood that the bonding layer 144 may not be applied on top of the entire inner surface 131 of the film 128 and any intervening layers because, as discussed in more detail below, various openings 125 may be needed for facilitating external charging of the wearable device 100 or where openings 126 may be needed to be expose where sensors 127 may be placed (see FIGS. 12-14). Moreover, the bonding layer 144 may not be applied over a portion of the conductive ink layer and any intervening layers so that the resistance of the parasitic element 600 can be measured at one or more exposed sections 624 after injection molding of the plastic cover 122 and prior to final assembly of the wearable device 100 and so that the conductive ink layer forming the parasitic element 600 can be electrically connected to the printed circuit board 300 at one or more exposed sections 626 (see FIG. 12).

Figure 12:
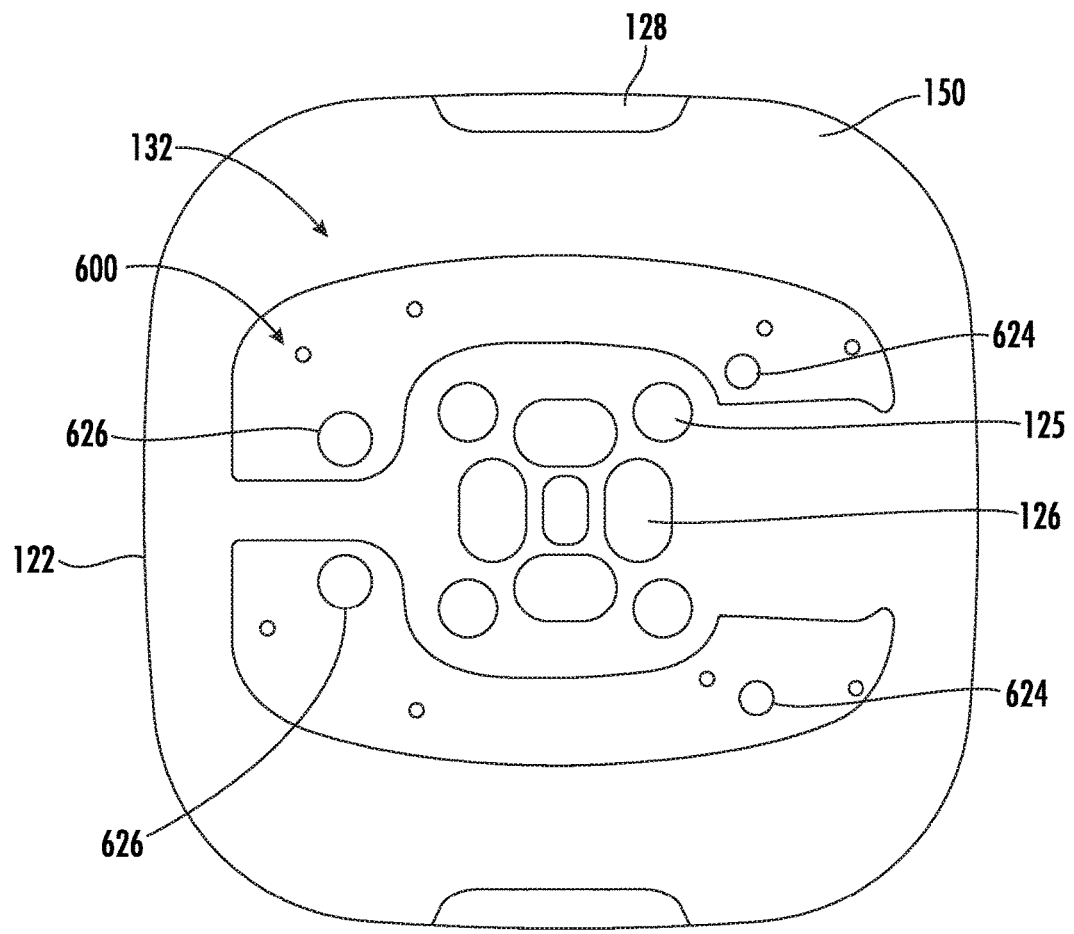
FIG. 12 depicts a top view of the label, including the film and the parasitic element of FIG. 11 with the bottom cover removed according to some implementations of the present disclosure.

Turning now to FIG. 12, a top view of the label 150, which includes the film 128 and parasitic element 600 of FIG. 11 with the bottom cover 122 removed according to some implementations of the present disclosure is shown. As shown, the conductive ink layer forming the parasitic element 600 can include one or more exposed sections 624 that are free of the second insulating layer 140, the second gloss layer 142, and the bonding layer 144 so that the resistance of the parasitic element 600 can be measured after injection molding of the bottom cover 122 and prior to assembly of the wearable device 100. Further, as shown, the conductive ink layer forming the parasitic element 600 can include one or more exposed sections 626 that are free of the second insulating layer 140, the second gloss layer 142, and the bonding layer 144 so that the parasitic element 600 can be electrically connected to the printed circuit board 300 via openings 620 in the bottom cover 122 (see FIGS. 13-14).

Referring still to FIG. 12, the arrangement of the parasitic element 600 on the cover 122 is discussed in more detail. In particular, the configuration of the parasitic element 600 may be selected to occupy a significant portion (20-80%) of the cover 122, and, in turn, the biosensor hub of the wearable device 100. While not limited to any specific shape, the shape of the parasitic element 600 can be driven by other factors such as the location of the sensors 127 (e.g., heart rate monitor sensors), or location of the injection molding gates used to form the cover 122. The shape of the parasitic element 600 can be selected to balance achieving a larger surface area while also maximizing the clearance to the nearest metal parts of the wearable device (e.g., the PCB 300 or the conductive housing 120). As such, the parasitic element 600 generally does not extend to the edges of the cover 122 (and thus the edges of the biosensor hub of the wearable device 100) because that area is too close to the conductive housing 120. The largest dimensions of the parasitic element 600 are generally between about $\frac{1}{10}$ of a wavelength to about $\frac{1}{2}$ of a wavelength of the lowest frequency that is being boosted by the parasitic element 600. Further, it is to be understood that there could be multiple parasitic elements 600 printed or otherwise disposed on the film 128 to form the label 150. In other words, the label 150 can include one or more parasitic elements 600, such as 2, 3, 4, 5, 6, or more parasitic elements 600, where it is to be understood that the number of parasitic elements 600 could match up to the number of openings 620 in the bottom cover 122 for connection of the parasitic element 600 to the printed circuit board 300 via any desirable fastener or contact (e.g., spring clip 614 and booster pin 616, compression spring 618, etc. as shown in FIGS. 13-16).

Figure 13:
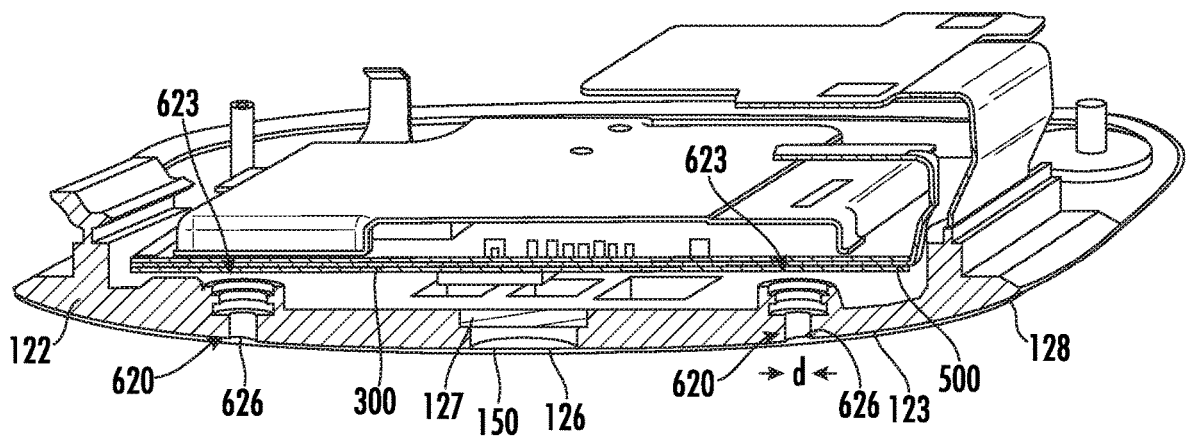
FIG. 13 depicts a cross-sectional perspective view of a printed circuit board, a slot antenna, a bottom cover, a parasitic element, and a film of a wearable device according to some implementations of the present disclosure.

Turning now to FIGS. 13-14, FIG. 13 depicts a cross-sectional perspective view of a printed circuit board 300, a slot antenna 500, a bottom cover 122, and a label 150, which includes a parasitic element 600 and a film 128, as well as the other various layers discussed above, of a wearable device 100, and FIG. 14 is a zoomed-in view of FIG. 13 showing the slot antenna 500 and openings 620 in the bottom cover 122 for connection of the parasitic element 600 to the printed circuit board 300 in more detail according to some implementations of the present disclosure. The distance D2 (see FIG. 14) between the parasitic element 600 and the antenna 500 can range from about 1.25 millimeters to about 3.5 millimeters, such as from about 1.5 millimeters to about 3 millimeters, such as from about 1.75 millimeters to about 2.75 millimeters in order to optimize the GPS performance of the wearable device 100. The openings 620 in the bottom cover 122 are generally aligned with the exposed sections 626 of the conductive ink layer forming the parasitic element 600 (see FIG. 12) for connecting the parasitic element 600 to the printed circuit board 300. The diameter d of the openings 620 can range from about 0.6 millimeters to about 1.2 millimeters, such as from about 0.7 millimeters to about 1.1 millimeters, such as from about 0.8 millimeters to about 1 millimeter. Without intending to be limited by any particular theory, the present inventors have found that such a diameter range preserves the strength and integrity of the film 128 while also ensuring that the mechanical connection between the parasitic element 600 and the printed circuit board 300 is sufficient. Additionally, conductive pads 622 in the form of a glue, paste, foam, or other suitable medium can be applied to the parasitic element 600 such that the conductive pads 622 are aligned with the openings 620 in the bottom cover 122 to enhance the mechanical connection of the parasitic element 600 to the printed circuit board 300 via a fastener in the form of a spring clip 614 and booster pin 616 or a compression spring 618 as discussed in more detail below (see FIGS. 15-16). Further, conductive pads 623 in the form of a glue, paste, foam, or other suitable medium can be applied to the printed circuit board 300 to also enhance the mechanical connection of the parasitic element 600 to the printed circuit board 300 via a fastener in the form of a spring clip 614 and booster pin 616, a compression spring 618, or any other suitable fastener as discussed in more detail below (see FIGS. 15-16).

Figure 16:
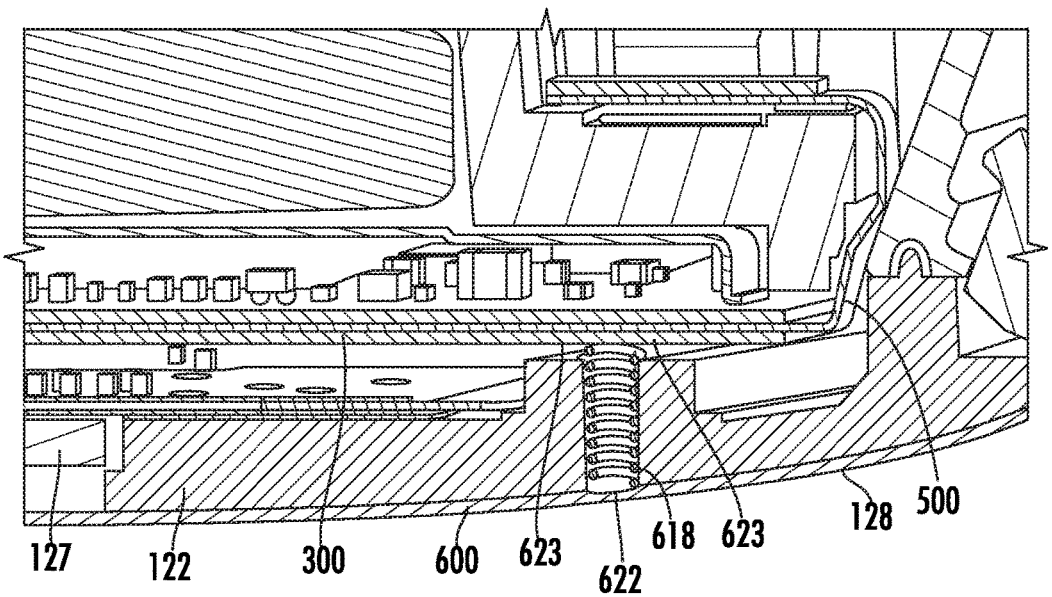
FIG. 16 depicts another configuration for mechanically connecting a parasitic element to a printed circuit board according to some implementations of the present disclosure.

As mentioned above, FIG. 15 depicts one configuration for mechanically connecting the parasitic element 600 to the printed circuit board 300 according to some implementations of the present disclosure via a spring clip 614 and a booster pin 616, where conductive pads 622 and 623 are used to enhance the mechanical connection between the components. The spring clip 614 and booster pin 616 may be used when higher frequencies are required of the antenna 500 in the wearable device 100 (e.g., GPS applications). Further, FIG. 16 depicts another configuration for mechanically connecting the parasitic element 600 to the printed circuit board 300 according to some implementations of the present disclosure via a compression spring 618. The inductance inherently present in the compression spring 618 may be desired, for instance, in applications where lower frequencies are required of the antenna 500 in the wearable device (e.g., LTE applications).

Figure 17:
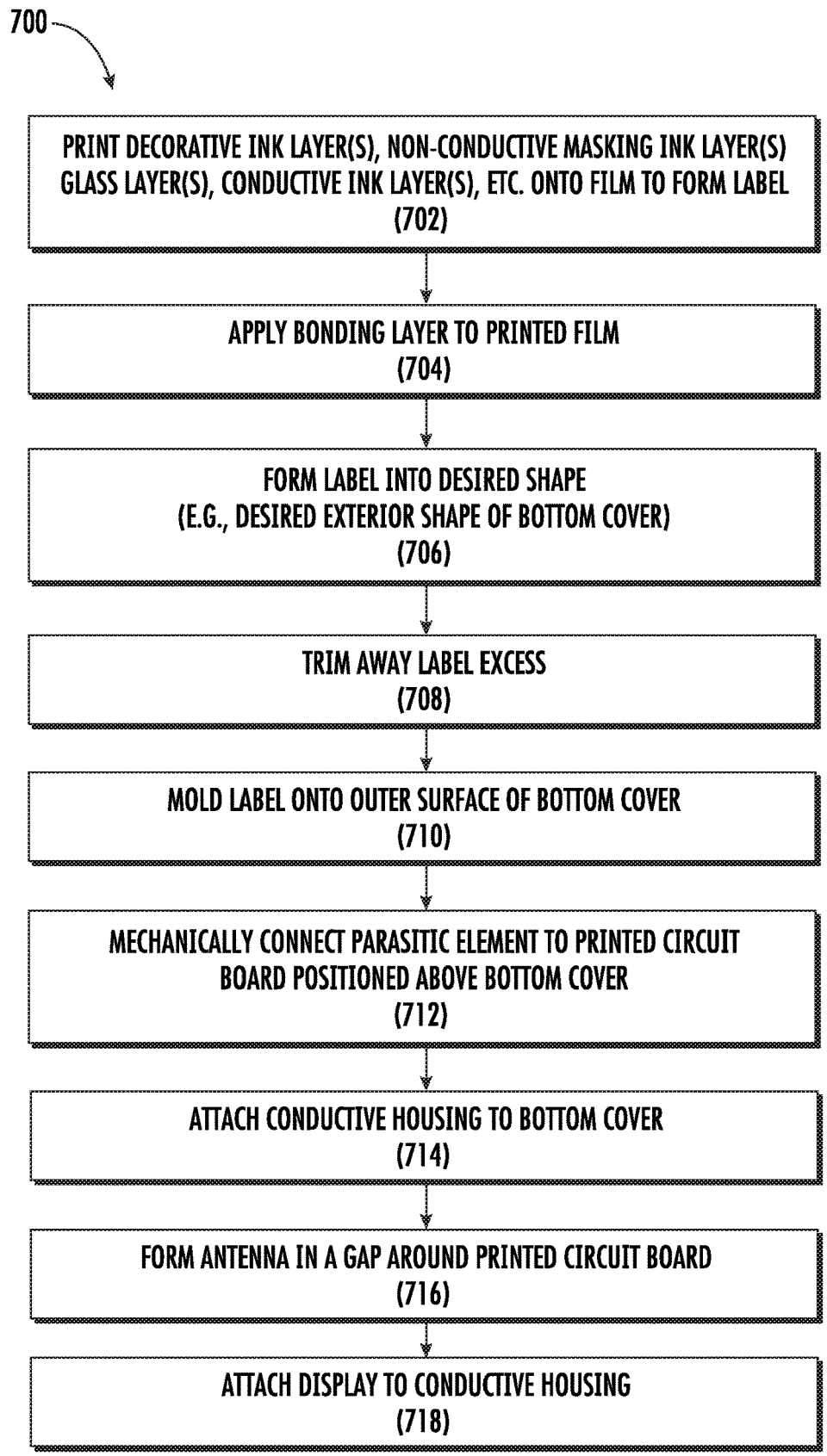
FIG. 17 depicts a method of assembling a wearable device that may include a film, a parasitic element, a plastic cover, a printed circuit board, a slot antenna, a conductive housing, and a display according to some implementations of the present disclosure.

FIG. 17 depicts a method 700 of assembling a wearable device 100 that may include a label 150, a cover 122, a printed circuit board 300, an antenna 500 (e.g., a slot antenna), a conductive housing 120, and a display 112 according to some implementations of the present disclosure. For instance, in step 702, one or more decorative ink layers 130, non-conductive masking ink layers 132, gloss layers 134 and/or 142, insulating ink layers 136 and/or 140, and conductive ink layers forming a parasitic element 600 can be printed or otherwise applied onto a film 128 to form the label 150. Then, in step 704, a bonding layer 144 can be applied to the film 128 with the various layers printed or otherwise applied thereon. Next, in step 706, the label 150 can be formed into a desired shape (e.g., a shape that corresponds with the shape of the outer surface 123 of the bottom cover 122), after which any label 150 excess can be trimmed away in step 708. Thereafter, in step 710, the label 150 can be molded onto the outer surface 123 of the bottom cover 122, such as via insert molding. Next, in step 712, the parasitic element 600 that is a part of the label 150 can be mechanically connected to a printed circuit board 300 that is positioned above the bottom cover 122. Next, in step 714, the conductive housing 120 can be attached to the bottom cover 122. Further, in step 716, the antenna 500 can be formed by the gap 400 around the printed circuit board 300. Then, in step 718, the display 112 can be attached to the conductive housing 120. Lastly, it should be understood that the steps of the above method 700 can be performed in any other appropriate order as would be understood by one of ordinary skill in the art.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable device comprising:
a printed circuit board;
a conductive housing;
an antenna;
a cover having an outer surface; and
a label comprising a film and a parasitic element, wherein the parasitic element is located between the film and the outer surface of the cover.

2. The wearable device of claim 1, wherein the parasitic element comprises a conductive ink layer.

3. The wearable device of claim 1, wherein the label is insert molded onto the outer surface of the cover.

4. The wearable device of claim 1, wherein the label comprises a decorative ink layer between the film and the parasitic element.

5. The wearable device of claim 4, wherein the label comprises a non-conductive masking ink layer between the decorative ink layer and the parasitic element.

6. The wearable device of claim 5, wherein the label comprises a first insulating ink layer.

7. The wearable device of claim 6, wherein the label comprises a first gloss layer between the non-conductive masking ink layer and the first insulating ink layer.

8. The wearable device of claim 6, wherein the label comprises a second insulating ink layer, wherein the parasitic element is between the first insulating ink layer and the second insulating ink layer.

9. The wearable device of claim 8, wherein the label comprises a bonding layer, wherein the bonding layer connects the label to the outer surface of the cover.

10. The wearable device of claim 9, wherein the label comprises a second gloss layer between the second insulating ink layer and the bonding layer.

11. The wearable device of claim 1, wherein the antenna is a slot antenna defined by a gap between the printed circuit board and the conductive housing.

12. A label for a wearable device containing an antenna, the label comprising multiple layers including a film, a decorative ink layer, a non-conductive masking ink layer, a first insulating ink layer, a parasitic element, and a second insulating ink layer, wherein the multiple layers of the label are applied onto the film, further wherein the parasitic element comprises a conductive ink layer.

13. The label of claim 12, further comprising a bonding layer.

14. The label of claim 12, further comprising a first gloss layer.

15. The label of claim 12, wherein a portion of the conductive ink layer is exposed and free of additional layers printed thereon.

16. The label of claim 12, wherein the label is configured for being joined to a plastic cover during an insert molding process.

17. The label of claim 12, wherein the parasitic element is electrically grounded to the printed circuit board via radio-frequency grounding, direct current grounding, or a matching circuit.

18. A method of forming a label for a wearable device containing an antenna, the method comprising:
- printing one or more layers of non-conductive masking ink onto a film;
- printing one or more layers of conductive ink onto the film to define a parasitic element;
- printing a bonding layer onto the film to form the label; and
- forming the label into a shape that matches a shape of a cover to which the label is to be applied.

19. The method of claim 18, wherein the label is joined to an outer surface of the cover during an insert molding process, wherein the bonding layer joins the label to the cover.

20. The method of claim 18, further comprising:
- printing one or more layers of decorative ink onto the film.

21. The method of claim 18, further comprising:
printing one or more layers of insulating ink onto the film.

22. The method of claim 18, further comprising:
trimming the label to remove any excess.

* * * * *